Francis P. Buiting and Robert E. Obenhaus,
Inventors.
Koenig, Senniger, Powers and Leavitt,
Attorneys.

United States Patent Office 3,457,460
Patented July 22, 1969

3,457,460
CONTROL APPARATUS
Francis P. Buiting, Plainville, and Robert E. Obenhaus, South Easton, Mass., assignors to Texas Instruments Incorporated, Dallas, Tex., a corporation of Delaware
Filed Dec. 30, 1966, Ser. No. 607,598
Int. Cl. H02h 7/08, 5/04; H02p 1/04
U.S. Cl. 317—13
17 Claims

ABSTRACT OF THE DISCLOSURE

In apparatus in which a thermistor is employed for controlling or limiting the energization of a heat generating electrical load such as a motor, current is selectively applied to the thermistor to generate heat internally therein for the purpose of modifying the response of the temperature control circuit to provide a differential between the temperatures at which the load is energized and deenergized or to provide thermal anticipation which minimizes any lag in the response of the temperature control circuit to rapid rates of temperature change in the load.

BACKGROUND OF THE INVENTION

This invention relates to control apparatus and more particularly to apparatus for controlling or limiting the energization of a heat generating electrical load such as a motor in response to variations in the resistance of a thermistor.

In temperature controls known heretofore in which thermistors are employed for temperature control or protection purposes, the role of the thermistor has typically been passive, that is, it has been used only for sensing or to provide a control voltage. Differentials in response or sensitivity to rates of change of thermistor resistance were typically provided, when required, by means separate from the thermistor itself.

One such known way of providing a differential between the trip and reset temperatures of an on-off temperature control is to change the input parameters of the control circuit when it trips so that, while one value of thermistor resistance is required to trip the control circuit, a different value is required to reset it. However, this method of producing a differential in response is not particularly effective when thermistors having very steeply sloped resistance characteristics are employed. In such a case, an appreciable difference in resistance levels may produce only an unusably small temperature differential.

The use of thermistors having steeply sloped resistance characteristics, particularly those PTC types having a relatively sharply defined threshold temperature above which the thermistor resistance rises abruptly, is highly advantageous in that the control or threshold temperature is determined essentially by the inherent characteristics of the thermistor itself relatively independently of the possibly variable parameters of the electronic control circuit. Further, such steeply sloped PTC thermistors may be connected in series to sense for the threshold temperature at a plurality of locations since the change in resistance in any one of the thermistors upon reaching the threshold temperature can be of an order of magnitude greater than the total resistance of the several thermistors prior to reaching the threshold temperature. It is thus highly advantageous to provide a way of providing a response differential in temperature controls using such thermistors without relying on changes in the characteristics of the control circuitry.

In providing sensitivity to rapid rates of temperature change, e.g., to protect electric motors under locked rotor conditions, it has heretofore been known to provide separate heaters to apply a false heat to a protective thermostat so that a so-called anticipation effect is obtained. Such separate heaters, however, greatly add to the complexity of such protectors.

SUMMARY OF THE INVENTION

Among several objects of the present invention may be noted the provision of apparatus for controlling the energization and deenergization of a heat producing electrical load and providing an advantageous differential between the temperatures of the load at which it is energized and denergized; the provision of such apparatus which can employ steeply sloped PTC thermistors for sensing the temperature of the load; the provision of such apparatus which prevents thermal lag of the sensing thermistor under conditions of high rate of temperature rise; the provision of such apparatus which employes semiconductor components; and the provision of such apparatus which is reliable and which is relatively simple and inexpensive. Other objects and features will be in part apparent and in part pointed out hereinafter.

Briefly, in apparatus of this invention in which the energization of a heat generating electrical load is controlled by circuit means in response to variations in the resistance of a thermistor which senses the temperature of the load, current is selectively applied to the thermistor thereby to generate a so-called false heat within the thermistor. This internally generated heat modifies the response or operation of the temperature control circuit in relation to changes in temperature of the electrical load.

In one aspect of the invention, this current is applied to the thermistor in response to deenergization of the load thereby producing a regenerative thermal feedback around the control circuit which provides a differential in response between the temperatures of the load at which it is energized and deenergized.

In another aspect of the invention, this modifying current is applied in response to the resistance of the thermistor thereby to produce a thermal anticipation which reduces thermal lag of the thermistor with respect to the load.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
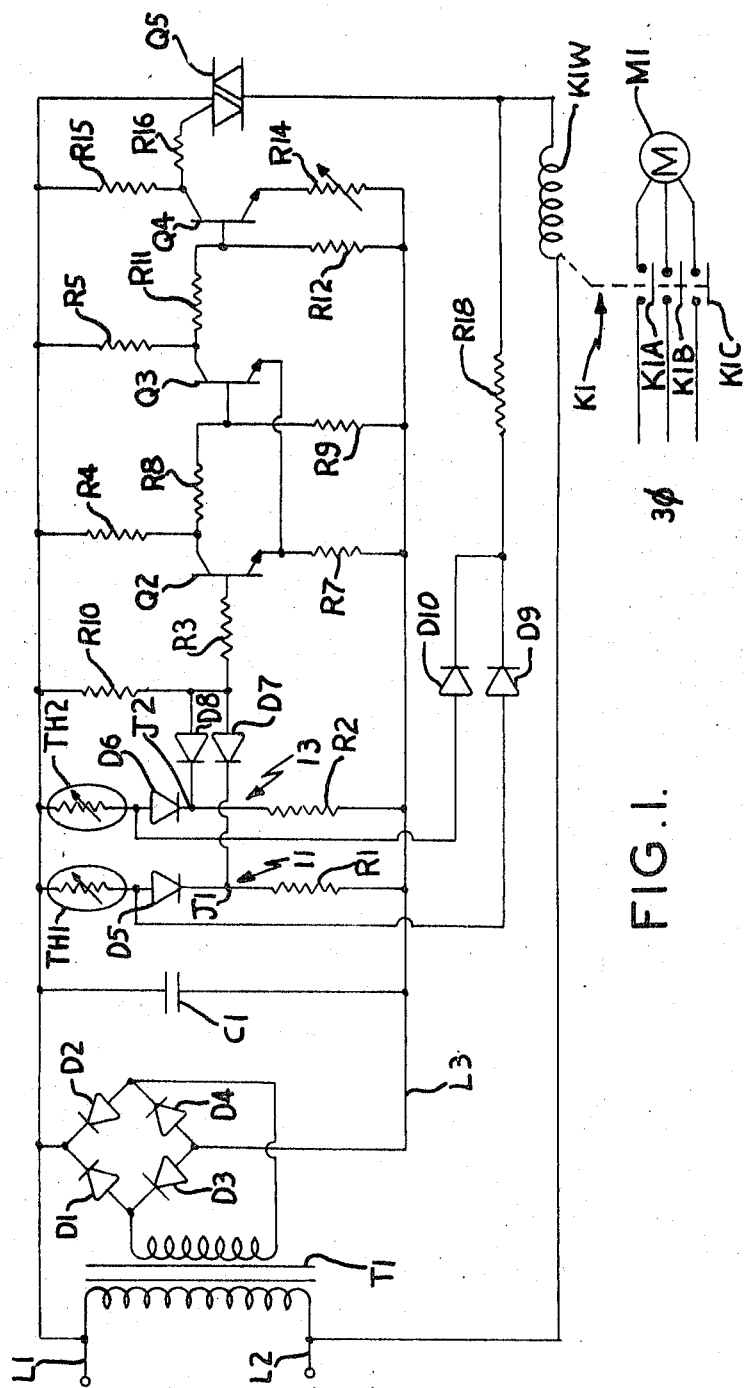
FIG. 1 is a schematic circuit diagram of temperature control apparatus of this invention in which current is applied to a temperature sensing thermistor for providing a differential in the response of the circuit.

Referring now to FIG. 1, A.C. power, for example at the conventional line voltage of 115 v. A.C. is provided to this temperature control circuit through a pair of supply leads L1 and L2. Direct current, at a lower voltage suitable for transistor circuitry, is provided between lead L1 and a lead L3 by a D.C. power supply comprising a step-down transformer T1, a full-wave bridge rectifier including diodes D1–D4, and a filter capacitor C1.

Connected across leads L1 and L3 are two voltage dividers 11 and 13, each of which includes a respective PTC thermistor TH1 and TH2, a respective reference resistor R1 and R2, and a respective gating diode D5 and D6. Each of the dividers 11 and 13 has a junction, J1 and J2 respectively, which is between the respective thermistor and reference resistor. Voltage dividers 11 and 13 provide at these junctions control voltages which vary substantially as functions of the resistance of the respective thermistors.

Junctions J1 and J2 are connected, through respective blocking diodes D7 and D8 and a common current limiting resistor R3, to the base terminal of one of a pair of NPN transistors Q2 and Q3 which are connected in a Schmitt trigger or level detecting circuit. The collectors of transistors Q2 and Q3 are connected to line L1 through respective load resistors R4 and R5 and their emitters are commonly connected to lead L3 through a resistor R7. The collector of transistor Q2 is also connected to the base terminal of transistor Q3 through a voltage divider comprising a pair of resistors R8 and R9. Transistor Q2 is normally biased toward conduction by current flowing through a resistor R10 which connects the base circuit of this transistor to lead L1.

As is understood by those skilled in the art, the trigger circuit comprising transistors Q2 and Q3 is operative to change from a first state in which Q2 is cut off and Q3 is conducting to a second state in which Q2 is conducting and Q3 is cut off when the voltage applied to the base of transistor Q2 passes a predetermined threshold moving toward more positive voltage levels.

The collector of transistor Q3 is connected, through a voltage divider comprising a pair of resistors R11 and R12, to the base of an NPN transistor Q4 connected as a common emitter amplifying stage. The emitter of transistor Q4 is connected to line L3 through a gain adjusting rheostat R14 and the collector is connected to line L1 through load resistor R15. The collector of transistor Q4 is also connected, through a current limiting resistor R16, to the gate of a triac Q5. Triac Q5 is a three-terminal semiconductor current switching device which, as understood by those skilled in the art, is operative to pass alternating current between its first and second anode terminals when triggering current of greater than a predetermined value is applied to its gate terminal. The operating winding K1W of a motor contactor K1 is connected across leads L1 and L2 through a circuit which includes the anode terminals of triac Q5. When triac Q5 is triggered, winding K1W is thus energized directly from the A.C. supply leads L1 and L2. Contactor K1 includes contacts K1A, K1B and K1C which are connected for energizing a motor M1 from three-phase supply mains when winding K1W is energized. Motor M1 constitutes a heat generating electrical load and thermistors TH1 and TH2 are physically positioned in heat exchange relationships with the motor for sensing the temperature of this motor load, the resistance of each thermistor being a function of the temperature of the load.

Current taken from between triac Q5 and winding K1W is applied, through a current limiting resistor R18 and respective gating diodes D9 and D10, to the thermistors TH1 and TH2.

The operation of the circuit of FIG. 1 is as follows. Assuming that motor M1 is relatively cool, the thermistors TH1 and TH2 will also be relatively cool and will exhibit relatively low resistances in relation to the values of transistors R1 and R2. The voltages at junctions J1 and J2 are thus positive with respect to the threshold voltage of the Schmitt trigger circuit and diodes D7 and D8 are reverse biased. Transistor Q2 is biased into conduction by current flowing through resistor R10 and transistor Q3 is cut off.

When transistor Q3 is not conducting, transistor Q4 is forward biased and applies triggering current, through resistor R16, to the gate terminal of triac Q5. Triac Q5 is thus triggered into conduction and contactor K1 and motor M1 are energized. In this state, that is, when the triac Q5 conducts, virtually no voltage is developed across the two anode terminals and thus no current is applied through resistors R18 to the thermistors TH1 and TH2.

If motor M1 overheats, that is, if it reaches a temperature such that either of the thermistors TH1 or TH2 exhibits a relatively high resistance in relation to the value of the respective reference resistor, a voltage is developed at the respective junction J1 or J2 which is negative with respect to or falls below the trip threshold of the Schmitt trigger circuit. When this happens, the respective diode D7 or D8 is forward biased and the bias current flowing through resistor R10 is diverted away from the base terminal of transistor Q2. The Schmitt trigger circuit then reverses states so that the transistor Q2 is cut off and the transistor Q3 conducts.

When transistor Q3 conducts, bias current is drawn away from the base terminal of transistor Q4 which in turn cuts off the flow of triggering current to the gate terminal of triac Q5, thereby deenergizing contactor K1 and motor M1. In this state, that is, when triac Q5 ceases to conduct, the A.C. supply voltage appears across the anode terminals of the triac instead of winding K1W. During those A.C. half-cycles when the lead L2 is negative with respect to the lead L1, the voltage appearing across the anode terminals of triac Q5 forward biases or switches the diodes D9 and D10 so that current can flow through resistor R18 from the load circuit to the thermistors TH1 and TH2. This current, coming as it does from a relatively high voltage source, causes an appreciable so-called false heat to be generated internally within the thermistors, tending to drive them beyond the temperature at which they caused the motor M1 to be deenergized. This heating effect is regenerative with respect to heat emanating from the motor and thus prolongs the period over which the motor is deenergized following tripping of the control circuitry. Accordingly, the motor must cool to a substantially cooler temperature than that at which it was deenergized before it is reenergized by this control circuit. Thus, the response of this control circuit is modified by the introduction of a differential between those temperatures of the motor at which it is energized and deenergized. The magnitude of the differential may be adjusted by varying the value of resistor R18 and different resistors may be provided for the two sensing circuits if different differentials are desired.

While the heat producing load illustrated in this example has comprised an electric motor whose temperature is limited or controlled, it should be understood that the temperature of other heat producing loads might also be controlled in similar manner, the sensing thermistors being positioned for sensing the temperature of the particular load. For example, the electric load may be constituted by an electric heater and the control can then control the temperature in the zone affected by the heater.

Figure 2:
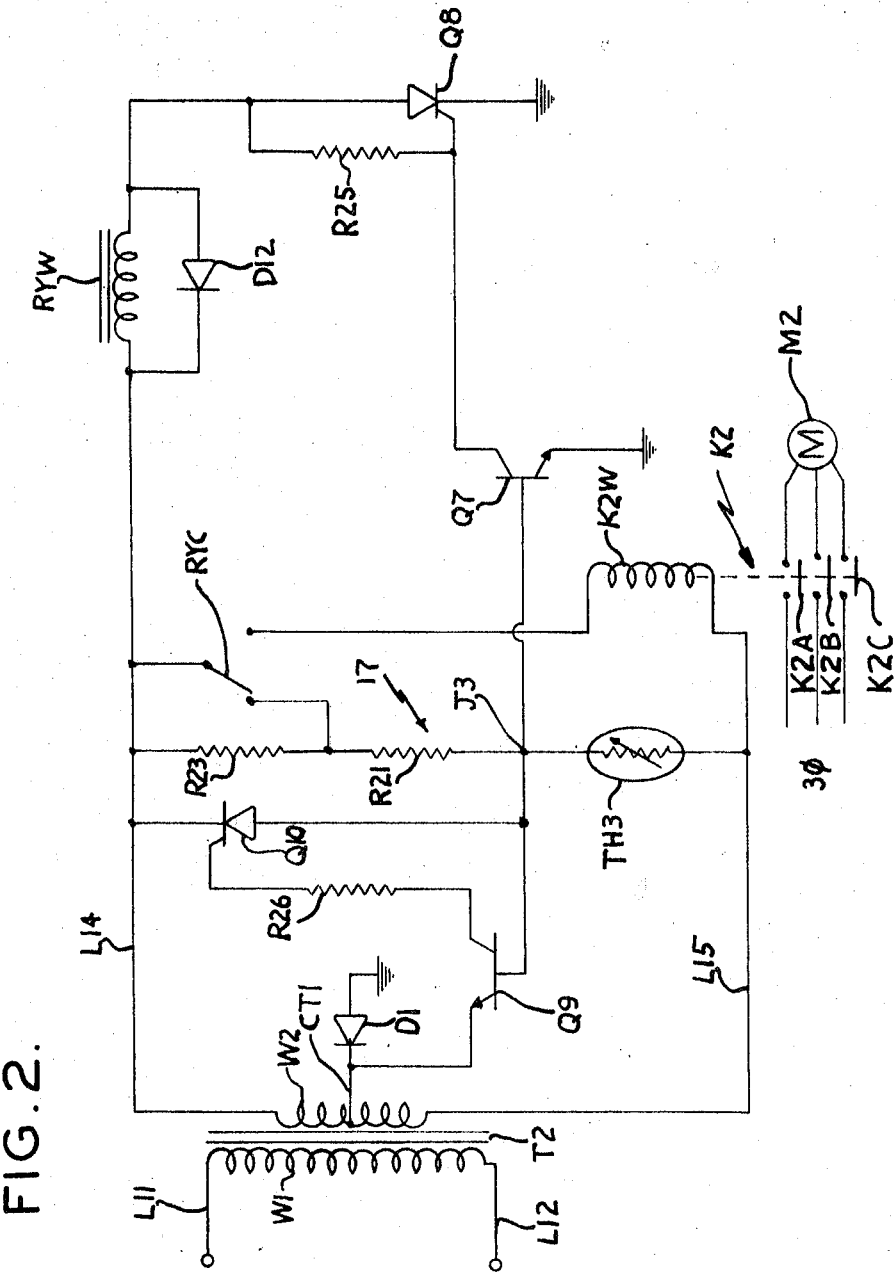
FIG. 2 is a schematic circuit diagram of temperature control apparatus in which current is applied to a temperature sensing thermistor for producing thermal anticipation.

Referring now to FIG. 2, A.C. power for energizing the motor protection control apparatus illustrated is supplied, through a pair of supply leads L11 and L12, to the primary winding W1 of a step-down transformer T2. Transformer T2 includes a secondary winding W2 for providing a source of alternating current at a voltage suitable for transistor circuitry. Winding W2 includes a center tap CT1 which provides an intermediate voltage source connection. Center tap CT1 is connected to ground through a diode D11 and thus, when this diode is forward biased, winding W2 provides out-of-phase A.C. to a pair of leads L14 and L15.

A voltage divider 17 is connected between leads L14 and L15 and includes a PTC thermistor TH3, a reference resistor R21 and a differential resistor R23 connected in series. Resistor R23 is selectively shunted out of the divider by the normally closed side of a set of relay contacts RYC which are operated under the control of relay winding RYW. The normally open side of contacts RYC is connected for selectively energizing the operating winding K2W of a contactor K2. Contactor K2 includes contacts K2A, K2B and K2C connected for selectively energizing a motor M2 from three-phase supply mains. Thermistor TH3 is positioned for sensing the temperature of motor M2.

Voltage divider 17 includes a junction J3 between thermistor TH3 and reference resistor R21 providing a control voltage which varies substantially as a function of the resistance of the thermistor TH3. Junction J3 is connected to the base terminal of an NPN transistor Q7. The collector-emitter output circuit of transistor Q7 is connected across the gate-cathode input circuit of an SCR (silicon controlled rectifier) Q8, the emitter of the transistor and the cathode of the SCR being grounded. Relay winding RYW is connected between supply lead L14 and the anode of SCR Q8 and is thus energized when the SCR conducts. Winding RYW is shunted by a so-called "halfback" diode D12 which provides a path for inductively stored current on those half-cycles when lead L14 is negative with respect to ground, thereby preventing chattering of the relay. Bias current is normally provided to the gate terminal of SCR Q8 from its anode through a resistor R25.

Junction J3 is also connected to the base terminal of an NPN transistor Q9. The emitter of transistor Q9 is connected to the secondary winding center tap CT1 and its collector is connected, through a resistor R26, to the gate terminal of a second SCR Q10. The cathode of SCR Q10 is connected to line L14, and its anode is connected to the junction J3.

The operation of this circuit is substantially as follows, considering first those A.C. half-cycles when lead L15 is positive with respect to lead L14.

When the motor is relatively cool and line 15 is positive with respect to line L14, the low resistance of thermistor TH3 causes the voltage at junction J3 to be positive with respect to center tap CT1. This positive voltage forward biases transistor Q9. In this first state, when transistor Q9 is forward biased, its collector current triggers SCR Q10 causing current to flow between the lines L14 and L15 through the thermistor TH3. This application of the half-wave secondary voltage across thermistor TH3 generates an appreciable false heat within the thermistor. Accordingly, as the motor heats up toward the trip or deenergization threshold temperature described hereinafter, the temperature of thermistor TH3 does not tend to lag that of the motor but rather tends to equal it depending on the rate of rise. When the thermistor temperature reaches a first preselected threshold, the bias voltage applied to transistor Q9 drops to a value insufficient to produce triggering of the SCR Q10, and this portion of the circuit switches to a second state in which the application of heating current to thermistor TH3 is discontinued. This first threshold is selected so that the internal heating of the thermistor is terminated just before the trip threshold is reached so that the temperature at which deenergization of motor M2 is produced as described hereinafter is not affected by this thermal lag-preventing operation.

The portion of circuitry which selectively deenergizes the motor M2 to protect it from damaging high temperatures is operative on those A.C. half-cycles when lead L14 is positive with respect to lead L15. When motor M2 is relatively cool, the thermistor TH3 exhibits a relatively low resistance and the voltage at junction J3 is negative with respect to ground. Transistor Q7 is thus turned off and current flowing through resistor R25 is free to trigger the SCR Q8. Conduction in SCR Q8 energizes the relay operating winding RYW causing contacts RYC to energize the motor M2 through contactor K2. Thus, when the motor is cool it can be operated normally.

If, however, the motor M2 overheats, the thermistor TH3, sensing this increase in temperature, exhibits a higher resistance and the voltage at junction J3 becomes positive with respect to ground. When the thermistor resistance passes a second preselected threshold, i.e., the trip threshold, this positive voltage turns on transistor Q7, shunting triggering current away from the gate terminal of SCR Q8. SCR Q8 thus ceases to conduct, deenergizing the relay operating winding RYW and also the motor M2 through contactor K2. In deenergizing the motor, the contacts RYC return to the position shown in the drawing, shunting out the resistor R23 and thus shifting the balance of voltage divider 17 so that the junction J3 becomes even more positively biased. As is understood by those skilled in the art, this regenerative change in the balance of the sensing voltage divider produces a stabilizing differential between the temperatures of motor M2 at which it is energized and deenergized, thereby preventing instability or hunting of this control system. From the above, it can be seen that the basic load control functions are performed during those A.C. half-cycles when lead L14 is positive with respect to lead L15 while the thermal anticipation functions are performed on the alternate A.C. half-cycles.

Since the application of false heat to thermistor TH3 is maintained substantially up until the trip threshold is reached, the operation of this control circuit, modified by the selective self-heating of the thermistor, is effective to prevent lagging of the thermistor temperature and to provide rapid and immediate deenergization of the motor upon rapid rates of temperature rise. Thus, damage is prevented under locked rotor conditions which might cause the motor to reach damaging temperatures before deenergization if the temperature of the sensing element were allowed to lag.

While, in the embodiments illustrated, the portions of the circuits which produce self-heating of the sensing thermistors have been electrically isolated from the portions of the circuits which effect load energization and deenergization by time sharing of the thermistor during different portions of an A.C. cycle or by diode gating, it is to be understood that the temperature control circuitry can be operated on D.C. and the heating currents can be applied to the thermistor with A.C. voltages and that the different portions of the circuit may then be isolated from one another by means of suitable filters or reactive impedances.

It will be obvious to one skilled in the art that rather than employing the PTC thermistors described supra it is within the purview of the invention to use NTC thermistors with appropriate changes in the circuitry, e.g., in FIG. 1 by using NTC thermistors for TH1 and TH2 and interchanging their location as well as their associated diodes D5 and D6 with reference resistors R1 and R2 respectively.

As various other changes could also be made in the above constructions without departing from the scope of the invention, it is intended that all matter contained in the above description or shown in the accompanying drawings shall be interpreted as illustrative and not in a limiting sense.

What is claimed is:

1. Apparatus for controlling the energization of a heat generating electrical load, said apparatus comprising:
   a thermistor in heat exchange relationship with said load and having a resistance which is a function of the temperature of said load;
   control circuit means responsive to the resistance of said thermistor for energizing and deenergizing said load in response to changes in the resistance of said thermistor thereby to control the temperature of said load; and
   current switching means having first and second states and being operative in said first state for applying current to said thermistor thereby to generate false heat within said thermistor and being operative in said second state for discontinuing the application of said current to said thermistor whereby the operation of said control circuit means in response to variations in the temperature of said load is selectively modified by the state of said current switching means to cause a differential in the temperatures at which said load is energized and deenergized.

2. Apparatus as set forth in claim 1 wherein said current switching means for applying current to said thermistor is responsive to the resistance of said thermistor.

3. Apparatus as set forth in claim 1 wherein said current switching means for applying current to said thermistor is responsive to the deenergization of said load.

4. Apparatus for controlling the energization of a heat generating electrical load in response to variations in resistance of a thermistor the resistance of which varies as a function of the temperature of said load, said apparatus comprising:
a semiconductor current switching device which, when triggered, energizes said load;
voltage divider means including said thermistor and a reference resistance connected in series therewith for providing at a junction between said thermistor and said resistance a control voltage which varies substantially as a function of the resistance of said thermistor;
voltage responsive means interconnected with said divider and said switching device for triggering said switching device in response to control voltages which pass a preselected threshold thereby to control the temperature of said load; and
means responsive to the deenergization of said load for applying current to said thermistor to generate heat within said thermistor and to provide thermal regenerative feedback around said voltage responsive means whereby a differential in response is provided between the temperatures at which said load is energized and deenergized.

5. Apparatus as set forth in claim 4 wherein said voltage responsive means for triggering said switching device includes a Schmitt trigger circuit connected to said divider for responding to said control voltage.

6. Apparatus as set forth in claim 5 wherein said means for applying current to said thermistor include diode gating means interconnecting said thermistor and said semiconductor current switching device for heating said thermistor when said load is deenergized.

7. Apparatus as set forth in claim 4 wherein said heat generating load is a motor and wherein said apparatus includes a contactor for energizing said motor, said contactor having an operating winding connected in a power circuit in series with said semiconductor current switching device to be selectively energized thereby.

8. Apparatus as set forth in claim 7 wherein said semiconductor current switching device comprises a triac for selectively applying alternating current to said winding.

9. Apparatus as set forth in claim 7 wherein said means for applying current to said thermistor includes circuit means interconnecting said junction in said voltage divider to a junction in said power circuit between said semiconductor current switching means and said contactor winding.

10. Apparatus as set forth in claim 9 wherein said circuit means comprises a current limiting resistor and a gating diode.

11. Apparatus as set forth in claim 4 wherein said thermistor is of the PTC type having a steeply sloped resistance characteristic.

12. Apparatus for controlling the energization of a heat generating electrical load in response to variations in resistance of a thermistor the resistance of which varies as a function of the temperature of said load, said apparatus comprising:
a semiconductor current switching device which, when triggered, energizes said load;
voltage divider means including said thermistor and a reference resistance connected in series therewith for providing at a junction between said thermistor and said resistance a control voltage which varies substantially as a function of the resistance of said thermistor;
means interconnected with said voltage divider and responsive to said control voltage for applying current to said thermistor until the resistance of said thermistor passes a first preselected threshold thereby to generate heat within said thermistor for reducing the thermal lag of said thermistor with respect to said load; and
means interconnected with said divider and said switching device and responsive to said control voltage for triggering said switching device until the resistance of said thermistor passes a second preselected threshold.

13. Apparatus as set forth in claim 12 wherein said voltage divider is connected across a source having an intermediate voltage tap and wherein said means for triggering said switching device includes a transistor responsive to said control voltage relative to the voltage at said tap.

14. Apparatus as set forth in claim 13 wherein said means for applying current to said thermistor includes a second transistor responsive to said control voltage relative to the voltage at said tap.

15. Apparatus as set forth in claim 14 in which said means for applying current to said thermistor includes a second semiconductor current switching device which is selectively triggered by said second transistor and which interconnects said source and said junction for selectively applying current from said source to said thermistor.

16. Apparatus as set forth in claim 15 wherein said heat generating load is a motor and wherein said apparatus includes relay means for energizing said motor, said relay means including an operating winding connected in series with the first said semiconductor current switching means to be selectively energized thereby and contacts for selectively shunting a portion of said reference resistance thereby to provide a differential in the response of said apparatus to variations in the resistance of said thermistor.

17. Apparatus as set forth in claim 14 wherein said source provides alternating current and said means for triggering said switching device and said means for applying current to said thermistor are operative on respective alternate half-cycles of said alternating current.

References Cited
UNITED STATES PATENTS
3,329,869    7/1967    Obenhaus    317—13
3,366,843    1/1968    Evalds    317—13

JOHN F. COUCH, Primary Examiner

J. D. TRAMMELL, Assistant Examiner

U.S. Cl. X.R.

317—33, 41; 318—473